(12) United States Patent
Schröder et al.

(10) Patent No.: US 6,705,966 B2
(45) Date of Patent: Mar. 16, 2004

(54) MOTOR-VEHICLE DRIVE TRAIN

(75) Inventors: Rolf Schröder, Stuttgart (DE); Arno Röhringer, Ditzingen (DE); Günter Worner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 103 days.

(21) Appl. No.: 10/093,795

(22) Filed: Mar. 8, 2002

(65) Prior Publication Data

US 2002/0128117 A1 Sep. 12, 2002

(30) Foreign Application Priority Data

Mar. 9, 2001 (DE) .......................... 101 11 257

(51) Int. Cl.⁷ .......................... F16H 48/06; F16H 59/64
(52) U.S. Cl. .......................... 475/249; 475/233; 477/98
(58) Field of Search .......................... 477/98; 475/231, 475/233, 249, 252, 254

(56) References Cited

U.S. PATENT DOCUMENTS 5,611,746 A * 3/1997 Shaffer .................. 475/234 X
5,964,126 A * 10/1999 Okcuoglu .................. 74/650
6,361,466 B1 * 3/2002 Kyrtsos .................. 475/250 X

FOREIGN PATENT DOCUMENTS

| DE | 2602660 | * 8/1976 |
| DE | 39 21 323 | 6/1990 |
| DE | 42 30 989 | 3/1994 |
| DE | G 93 20 400.0 | 7/1994 |
| DE | 195 27 484 | 2/1996 |

* cited by examiner

Primary Examiner—Roger Pang
(74) Attorney, Agent, or Firm—Klaus J. Bach

(57) ABSTRACT

In a motor-vehicle drive train containing a differential, which has an differential input part and two differential output parts, a friction clutch with a limited transmittable torque is arranged between two of the differential parts, so that, with a small predetermined difference in torque between the two coupled differential parts, said friction clutch can slip to accommodate torque shocks. A temperature-dependent adjusting means is provided, which reduces the clutch engagement pressure with increasing clutch temperature.

21 Claims, 11 Drawing Sheets

MOTOR-VEHICLE DRIVE TRAIN

BACKGROUND OF THE INVENTION

The invention relates to a motor-vehicle drive train which contains a differential which has a differential input part and two differential output parts.

A motor-vehicle drive train of this type is known from DE 39 21 323 A1. A gear-shift transmission which can be driven by a motor-vehicle engine and can be shifted automatically or by hand drives a planetary gear mechanism. Of the planetary gear mechanism, an internally geared wheel is drivingly connected to an output shaft of the gear-shift transmission, a planet carrier is drivingly connected to a drive train leading to the rear axle of the motor vehicle, and an inner central gear is drivingly connected, via a front-axle clutch, to a drive train leading to the front axle of the motor vehicle. The planetary gear mechanism can be locked by a multi-plate locking clutch which is arranged between the planet carrier and the inner central gear and is engaged by spring means and disengaged by a pressure-medium actuated member. The front-axle clutch is engaged by a pressure-medium operated actuating member and disengaged by spring means. The planetary gear mechanism is a so-called "inter-axle" differential" because it distributes the propulsion power of the motor-vehicle engine in the longitudinal direction of the vehicle to the rear-wheel axle and the front-wheel axle. It is possible to select the following operating states:
1. Rear-wheel drive, in which case the locking clutch is engaged and the planetary gear mechanism is thus locked and the front-axle clutch is disengaged.
2. "Balanced four-wheel drive", in which case the locking clutch is disengaged and the front-axle clutch is engaged.
3. "Four-wheel drive with inter-axle locking", in which case the locking clutch and the front-axle clutch are engaged. This is also referred to as an all-wheel drive with inter-axle locking.

The clutches are fully disengaged or engaged in each case. Friction slip operation is not envisaged as a continuous mode of operation.

A similar motor-vehicle drive train with a transfer gear for distributing the drive torque to two different vehicle axles is known from DE 195 27 484 A1.

German Utility Model G 390 20 400.0 discloses a transfer gear for motor vehicles in the case of which an output shaft for a rear vehicle axle can optionally be connected by a form-fitting clutch, and is permanently connected by a friction clutch, to an output shaft for a front vehicle axle. The friction clutch has a relatively small transmittable torque. With the form-fitting clutch disengaged, the friction clutch acts as a shock absorber for reducing gear-shifting impacts and torque load-change impacts. Its moment of friction is so small that, in the case of small differences in torque and torque shocks, the clutch provides for friction slip operation. Drive-train play is used up by it. The friction clutch is not a part of the differential.

It is known from DE 42 30 989 A1 to correct the gear-shifting times of a transfer gear or intermediate transmission in dependence on the temperature of the gear or transmission.

In a drive train, impact noises occur when the load changes, in particularly upon a changeover from thrust to traction operation or vice versa. Such noises are avoided in all-wheel drive vehicles only if there is an inter-axle lock and if this is switched on, i.e. the front-wheel drive train and the rear-wheel drive train are locked with the input train of the transfer gear by a clutch for joint torque transmission.

It is the object of the present invention to prevent, in all-wheel drive vehicles impacts or shocks in the drive train, so as to provide for a comfortable operation of vehicles independently of whether the inter-axle is locked or not.

SUMMARY OF THE INVENTION

In a motor-vehicle drive train containing a differential, which has an differential input part and two differential output parts, a friction clutch with a limited transmittable torque is arranged between two of the differential parts, so that, with a small predetermined difference in torque between the two coupled differential parts, said friction clutch can slip to accommodate torque shocks. A temperature-dependent adjusting means is provided, which reduces the clutch-engagement pressure with increasing clutch temperature.

The invention takes account essential technical basic requirements which are to be met by a torque impact damping device. The active damping moment has to act at the maximum damping value during load transfer, i.e. during a torque transmission change in the drive train from traction to thrust or from thrust to traction. In the case of particular operating states, for example in the case of cornering, in the case of different rolling radii of the vehicle wheels or in the case of slippage on a vehicle axle, different power paths are initiated in the differential, and these can activate a clutch installed in the path. This may have considerable functional disadvantages, e.g. grabbing as a result of the excitation of frictional vibration in the drive train and wear in the drive train and in the clutch if the clutch according to the prior art is designed for the maximum clutch torque. Moreover, during towing, one vehicle axle is at a standstill so that considerable loading occurs in the clutch if the latter is constantly subjected to its full engaging pressure, with the result that the clutch may become defective and fail. The invention fulfils the following basic requirements, which are to be met by a torque impact damping device:
a) The damping arrangement has to function straightforwardly by mechanical action and has to take up a minimal amount of space.
b) The damping arrangement has to function at a location where the greatest amounts of play occur during load-changes in the drive train.
c) Load-changes mean short-term loading. The damping arrangement of the invention is therefore designed specifically for short-term loading. The invention results in the damping function in the friction clutch being dissipated in the case of continuous changes in speed in the two partial drive trains, e.g. "front axle and rear axle" or "left-hand and right-hand axle shaft".
d) The differential is predestined as the central installation space for the damping arrangement, or the friction clutch serving as damping arrangement, both in terms of the functional requirements and of the installation requirements in the drive train. Accordingly, in a preferred embodiment of the invention, the differential is the location where the damping friction clutch is arranged.

The invention provides, as an essential component of the friction clutch, a temperature-sensing element by means of which the contact-pressure force of the friction clutch and thus also the clutch torque can be controlled automatically. This temperature-dependent element prevents the above-mentioned disadvantages in the case of long-term loading and in the case of relatively high clutch loading (large clutch friction moments).

As the temperature-dependent element, a bimetal arrangement or a memory element arrangement (shape memory element) or some other temperature-dependent reaction element which alters its shape and/or its size depending on temperature may be used. The invention utilizes this alteration for automatically controlling the engaging pressure of the friction clutch and, if appropriate, also for fully disengaging the friction clutch.

According to a preferred embodiment of the invention, measures are provided which prevent the situation where the engaging pressure of the friction clutch is large enough for the drive train to become a "drive train with inter-axle locking" even at very low temperatures. This can be achieved by the element which can alter its shape depending on temperature and which is designed and arranged such that it only causes a temperature-dependent change in the clutch-engaging pressure above a predetermined temperature, but cannot enhance the clutch-engaging pressure below this temperature.

It is noted that a configuration of a drive train with all-wheel drive is particularly advantageous because only a small amount of space is required.

The invention will be described herein below with reference to the accompanying drawings on the basis of preferred embodiments.

DESCRIPTION OF PREFERRED EMBODIMENTS

Figure 1:
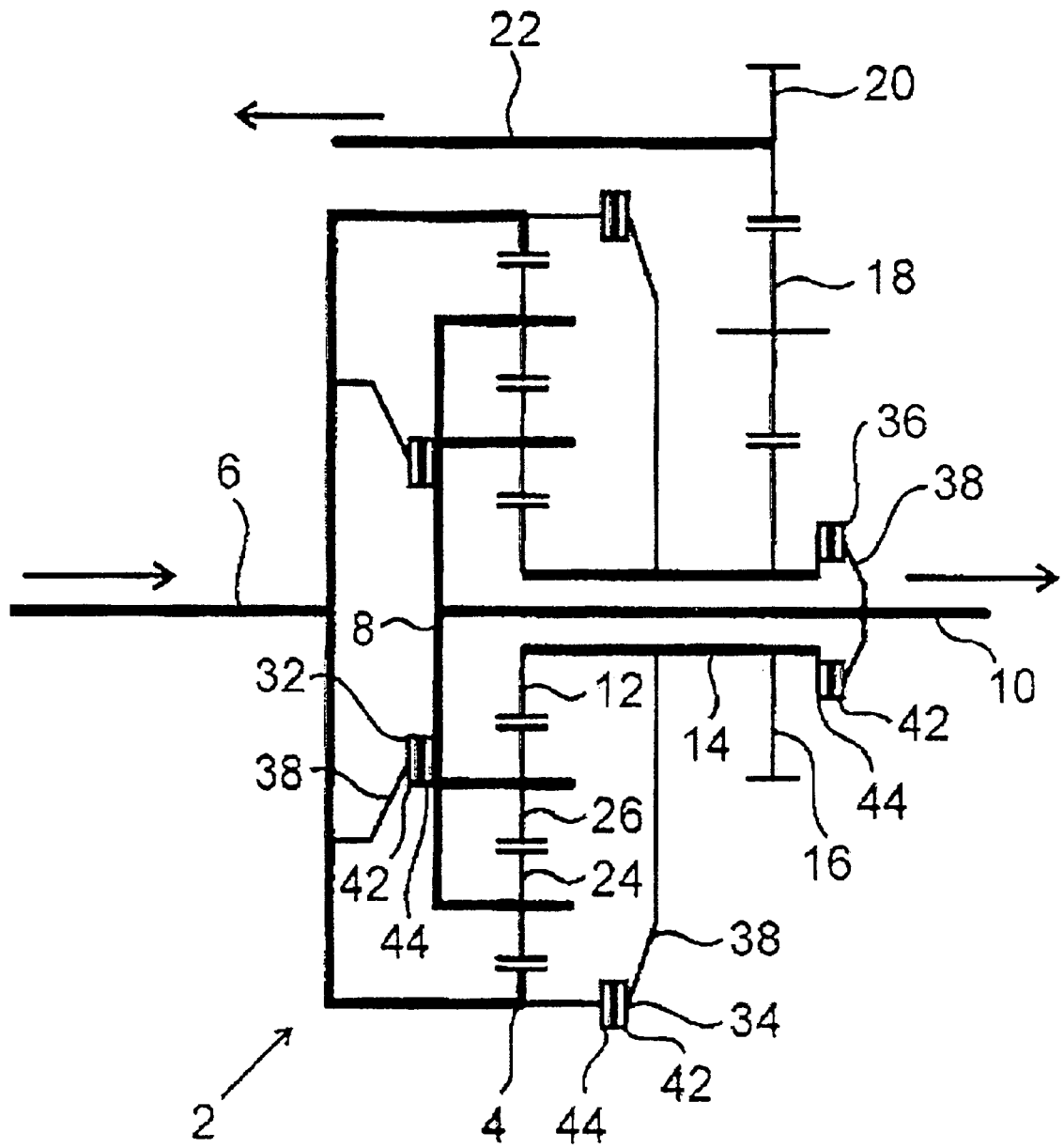
FIG. 1 shows an embodiment of a motor-vehicle drive train according to the invention.

The motor-vehicle drive train shown in FIG. 1 comprises a differential transmission 2 in the form of a planetary gear drive. An internally geared wheel 4 is connected by a drive shaft or input shaft 6, e.g. via a clutch (not shown), to an automatic or manual, infinitely variable or step-shift transmission (not shown) which can be driven by a vehicle engine (not shown either). The internally geared wheel 4 is thus a differential input part. A differential output part includes a planet carrier 8 which is connected, or can be connected, via a central driven shaft or output shaft 10, to the shaft train of a drive axle, e.g. of a rear axle of a motor vehicle, said axle not being shown. A further differential output part comprises a central, externally toothed sun gear 12, which is connected in a rotationally fixed manner to a second driven shaft or second output shaft 14 or is formed on said shaft. At its end which is remote from the sun gear 12, the second output shaft 14 is provided with, and connected in a rotationally fixed manner to, a further gear wheel 16 which, via an intermediate gear wheel 18, drives a gear 20 of a transmission shaft 22 which, via a differential gear (not shown) is, or can be, drivingly connected to shafts of a further vehicle axle, preferably a front axle, which is not shown.

The planet carrier 8 carries pairs of outer planetary gears 24 and inner planetary gears 26. The outer planetary gears 24 each engage the internally geared wheel 4 and one of the inner planetary gears 26. The inner planetary gears 26, moreover, engage the sun gear 12.

According to the invention, in all the embodiments, at least:

a) the differential input part is coupled to one differential output part, or b) the differential input part is coupled to the other differential output part, or c) the two differential output parts are coupled to one another by a friction arrangement, referred to below as friction clutch, which has such a low engaging pressure that, even when there is a small difference in torque between the two clutch parts, as it often occurs under normal driving conditions, and when torque shocks occur, as they do under normal driving conditions, the clutch transfers to a slip operation, wherein two clutch parts rotate relative to one another and produce a damping moment as a result of the friction between their clutch surfaces.

Figure 2:
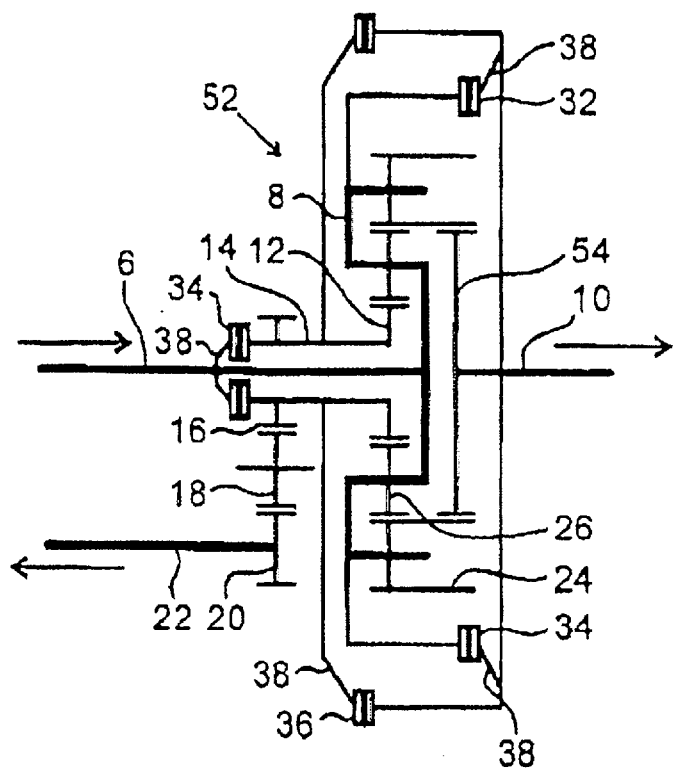
FIG. 2 shows a further embodiment of a motor-vehicle drive train according to the invention.
Figure 3:
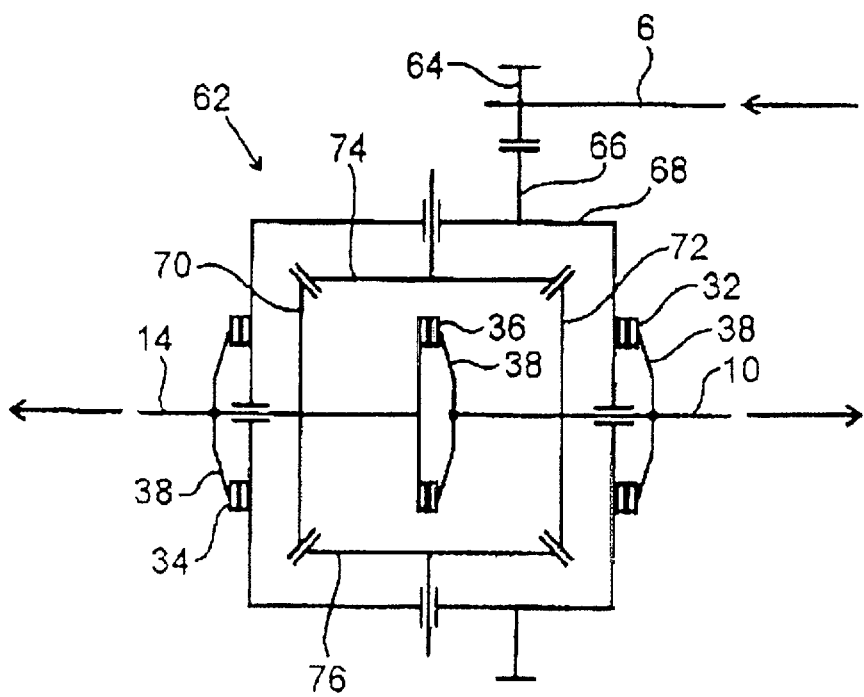
FIG. 3 shows a yet further embodiment of a motor-vehicle drive train according to the invention.

FIGS. 1 to 3 illustrate all three possibilities by way of three such friction clutches 32, 34, 36, although, in practice, the use of just one of these possible friction clutches is sufficient. Each of these friction clutches 32, 34, 36 is provided with a temperature-dependent adjusting element 38 which, at least in a predetermined temperature range, reduces the transmittable clutch torque, depending on the clutch temperature, as the clutch temperature increases and increases as the clutch temperature decreases. In the case of slip operation over a relatively long period of time, the clutch temperature normally increases, for example during towing operation or during long periods of driving round twisting bends. When the transmittable torque is reduced by reducing the clutch-engaging pressure as the clutch temperature increases, the clutch will not overheat and is not destroyed by overheating. The differential 2 as shown in FIG. 1 (and FIGS. 2 and 3) is a so-called "inter-axle differential" since it causes the power to be distributed between the rear-wheel drive by one output shaft 10 and the front-wheel drive by the transmission shaft 22. During towing, it is often only the front wheels (or the rear wheels) which are raised onto the towing vehicle, while the wheels of the other axle of the towed vehicle rotate. This produces large differences in speed in the differential 2 serving as an inter-axle differential. Large differences in speed are also produced during driving round bends, because the vehicle wheels on the outside of the bends rotate more quickly than the wheels at the inside of the bends. Such differences in speed are also produced in differential gears of the vehicle axles, which differential gears may be designed, for example, according to FIG. 3.

FIG. 1 shows such a friction clutch 32 between the internally geared wheel 4 (differential input part) and the planet carrier 8 (one differential output part). Instead, or in addition, it is possible for a friction clutch 34 to be arranged between the internally geared wheel 4 (differential input part) and the sun gear 12 (other differential output part) and/or for a friction clutch 36 acting in the same manner to be arranged between the planet carrier 8 (one differential output part) and the sun gear 12 (the other differential output part).

Each of these friction clutches 32, 34 and 36 contains at least one temperature-dependent adjusting element 38 which, at least in a predetermined temperature range, reduces the clutch-engaging pressure and thus the transmittable clutch torque, depending on the clutch temperature, as the clutch temperature increases. The clutch engagement pressure increases as the clutch temperature decreases. The adjusting element, which can be altered in size and/or shape depending on temperature, is preferably a bimetallic element or a memory element. Furthermore, it may be designed as a functional part of the friction clutch 32, 34 and 36, e.g., as a clutch plate or as a clutch friction plate with or without friction lining. Memory elements are also known by the term shape memory elements since, once the deforming temperature has been removed, they assume their original shape again.

It is possible for this temperature-dependent adjusting element 38, according to FIGS. 1, 2 and 3, to be connected in a rotationally fixed manner to one of the two transmission parts which is to be coupled and to have, at an end remote therefrom, a clutch friction surface, e.g. a clutch friction lining 42, which engages a clutch friction surface, e.g. a clutch friction plate 44, which is fastened to the relevant other transmission part which is to be coupled. Of course, instead of single-plate clutches, it is also possible to form clutches with more than one plate.

The above description also applies to all the other embodiments. Consequently, the other embodiments will only be described below in terms of how they differ.

The motor-vehicle drive train according to the invention, which is shown in FIG. 2, contains a differential 52 in the form of a planetary gear mechanism without an internally geared wheel. An input shaft 6 is connected in a rotationally fixed manner to a planet carrier 8, which forms an input differential part and supports outer planet gears 24 and inner planet gears 26, which mesh with one another.

The radially outer planet gears 24 engage a first central sun gear 54, which is connected in a rotationally fixed manner to a first driven shaft or output shaft 10 and is intended for driving the vehicle wheels of a vehicle axle, e.g. of a rear-wheel axle. This central sun gear 54 forms the first of two output differential parts of the differential 52. A second sun gear 12 meshes with the radially inner planet gear 26 and forms a second differential output part for driving the vehicle wheels of another vehicle axle, for example of a front vehicle axle, via a second driven shaft or output shaft 14 with a gear wheel 16, which meshes with the gear wheel 20 of a transmission shaft 22 via an intermediate gear wheel 18. A friction clutch 32 with a temperature-dependent adjusting element 38 of the type mentioned is arranged between the differential input part, which is formed by the input shaft 6 and the planet carrier 8, and an differential output part, which is formed by a driven shaft 10 and a sun gear 54. It is also possible to provide another friction clutch 34 of this type with a temperature-dependent adjusting element 38 in order to couple the differential input part 6, 8 to the other differential output part 12, 14 in a temperature-dependent manner, for clutch slip operation. Likewise, it is also possible to provide a friction clutch 36 of this type with a temperature-dependent adjusting element 38 of the type mentioned in order to couple the two differential output parts 12, 14, on the one hand, and 54, 10 on the other hand, to one another in a temperature-dependent manner.

FIG. 3 shows a motor-vehicle drive train with a differential 62 which can be used as an inter-axle differential or as an axle differential (differential gear) in a vehicle axle. A drive shaft 6 with a gear 64 drives a gear 66, which is connected in a rotationally fixed manner to a differential-gear housing 68. Mounted in a rotatable manner in the housing 68, co-axially with the axis of rotation of the gear 66 of the same, are two helically toothed gear wheels 70 and 72 which are connected in a rotationally fixed manner each to one of two driven shafts or output shafts 10 and 14. The two helically toothed gear wheels 70, 72 engage with two further helically toothed gear wheels 74 and 76, which are mounted in a rotatable manner at right angles thereto in the differential-gear housing 68. According to the invention, at least one of the friction clutches 32 or 34 or 36 with associated temperature-dependent adjusting element 38 of the type mentioned is arranged between the differential input part 66, 68, which is formed by the differential-gear housing 68 and the gear wheel 66 thereof, and an differential output part 10, 72, which is formed by one output shaft 10 and the helically toothed gear wheel 72 thereof; or is arranged between the input differential part 66, 68 and the other differential output part 14, 70, which is formed by the other output shaft 14 and the helically toothed gear wheel 70 thereof; or is arranged between the two differential output parts 10, 70 on the one hand, and 14, 70 on the other hand.

The friction clutch 32 or 34 or 36 in each case only has a small transmittable torque which is variable in dependence on the clutch temperature in order, in the case of torque shocks and in the case of even small differences in torque between the coupled parts, to transfer into friction slip operation and thus to damp torque shock and to avoid locking of the differential.

Figure 4:
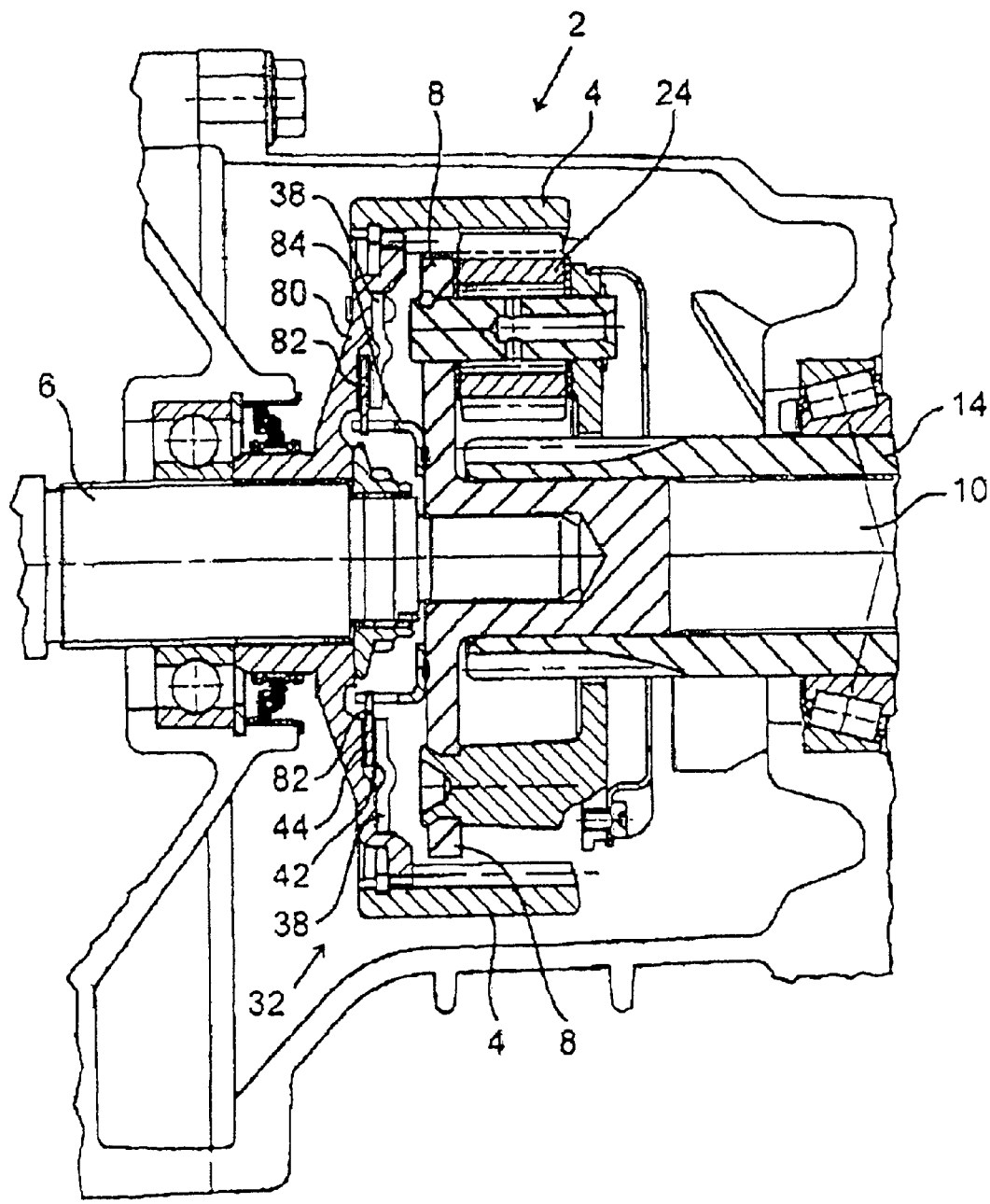
FIG. 4 is an enlarged illustration of a detail of the differential shown in FIG. 1 with a friction clutch according to the invention integrated therein for damping torque shocks by providing for some sliding friction in the friction clutch.

As the detail of FIG. 1 which is presented in FIG. 4 shows, the adjusting element 38, which can be altered in shape dependent on temperature, e.g. the bimetallic or memory element, may be arranged in the inter-space between the planet carrier 8 and a plate-like connection element 80, which retains the internally geared wheel 4 on the input shaft 6. The adjusting element 38 which can be altered in shape depending on temperature, at one end, is fastened, for example riveted, on the connecting element 80 and, with its other end, presses a clutch plate 82 against the connecting element 80, via clutch linings 42 and 44 in each case. It is possible for the clutch plate 82 to be displaced axially on a carrier 84, which is fastened, for example welded, on the planet carrier 8.

Figure 5:
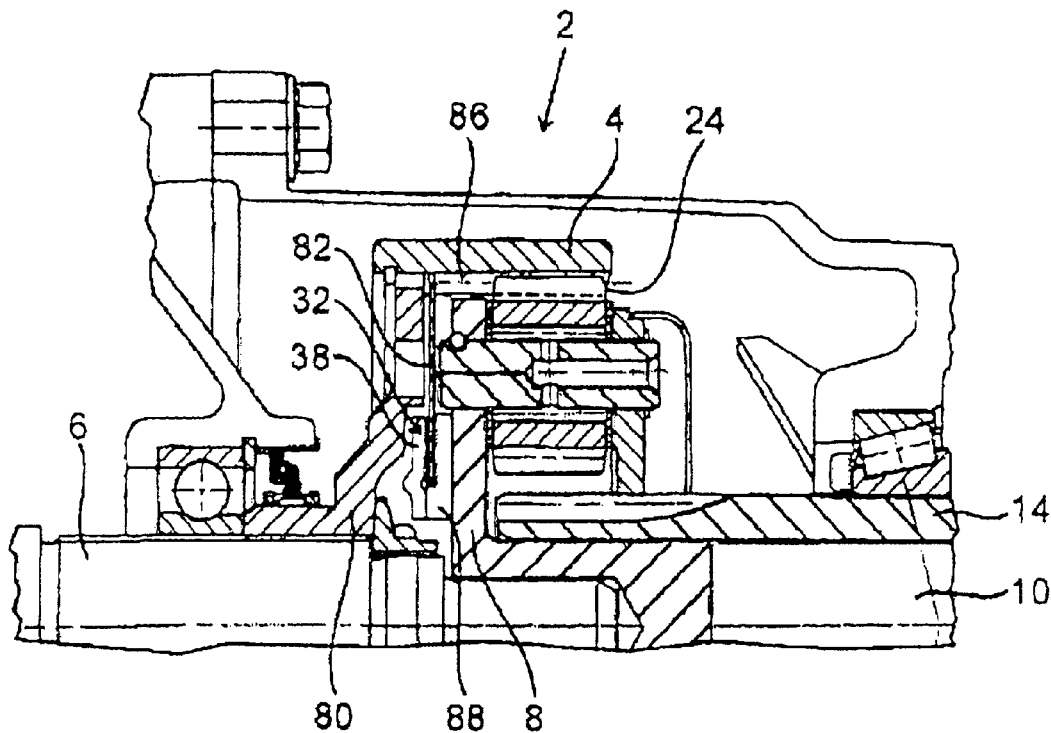
FIG. 5 shows the differential of FIG. 1 with a further embodiment of a friction clutch according to the invention integrated therein.

FIG. 5 shows an embodiment in which a clutch plate 82 has been inserted into the inner tooth structure 86 of the internally geared wheel 4 and, between the planet carrier 8 and the plate-like connecting element 80, is pressed resiliently, by the adjusting element 38 which can be altered in shape, depending on temperature, against a clutch disc 88 which, like the adjusting element 38, is fastened on the planet carrier 8.

Figure 6:
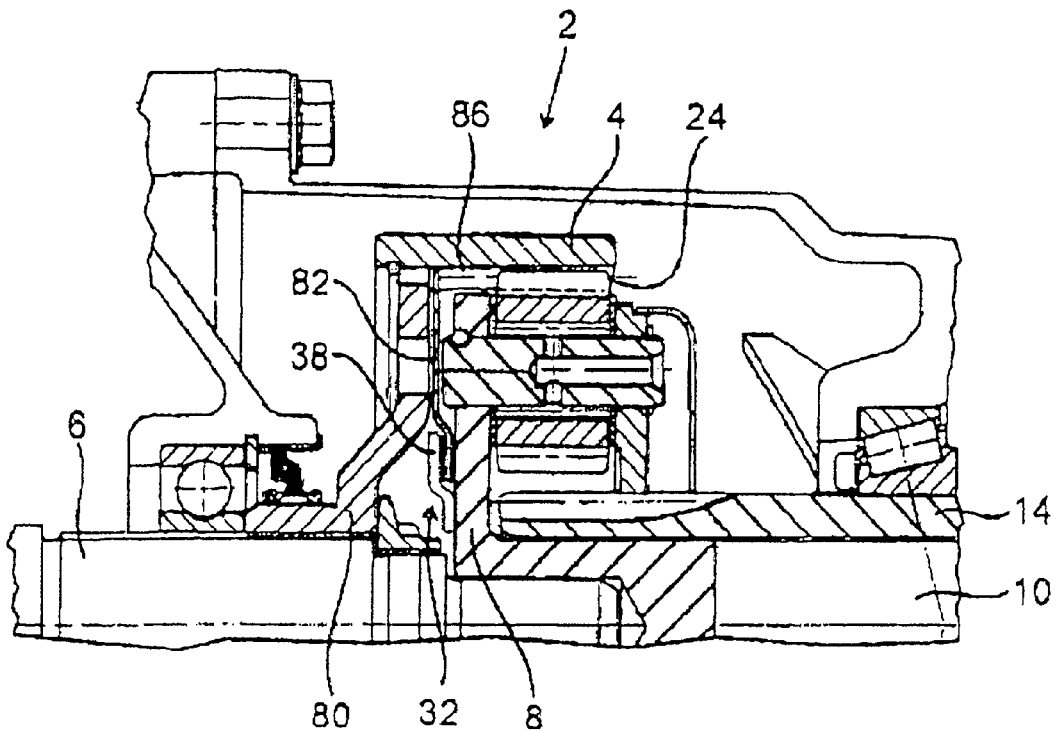
FIG. 6 shows the differential of FIG. 1 with yet another embodiment of a friction clutch according to the invention integrated therein.

FIG. 6 is the same as FIG. 5, albeit without the clutch disc 88. As a result, the clutch plate 82 is pressed by the adjusting element 38 which can be altered in shape in dependence on temperature, and is fastened on the planet carrier 8, against a clutch friction surface of the planet carrier 8.

In the case of all of the embodiments which have been described above and which will be described below, the friction surfaces may be formed by the relevant elements themselves or by friction linings applied thereto.

Figure 7:
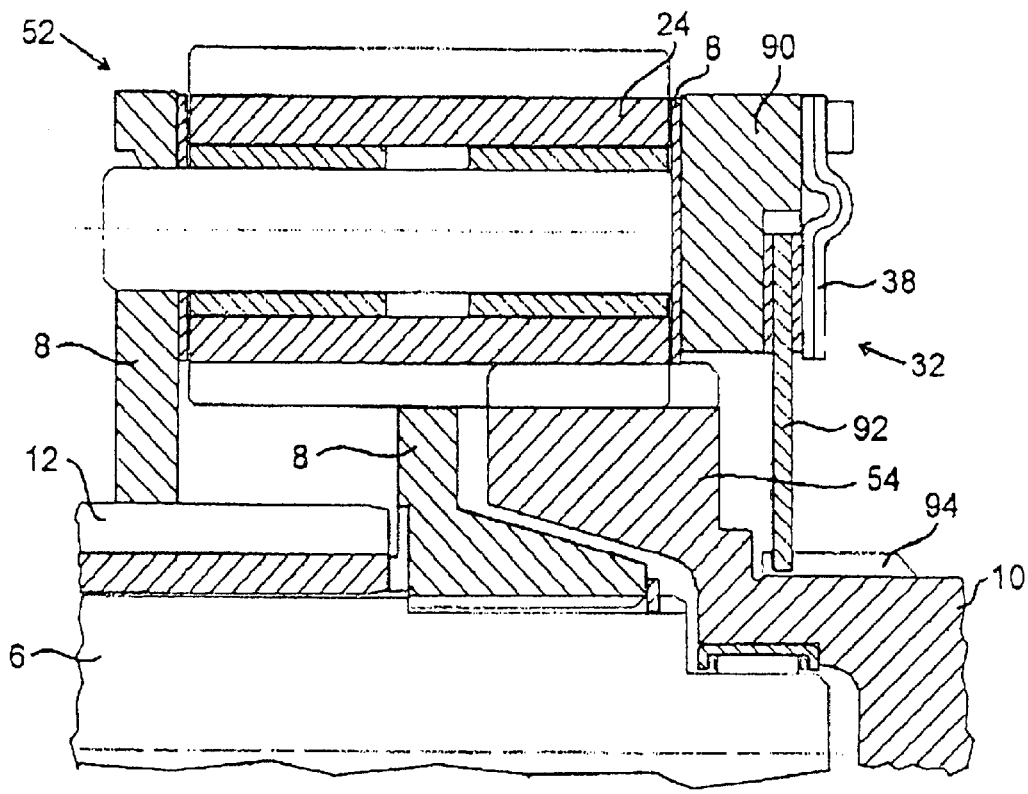
FIG. 7 is an enlarged illustration of a detail of the differential of FIG. 2 with a particular embodiment of a friction clutch integrated therein and intended for damping torque shocks by permitting some sliding friction in the friction clutch.

FIG. 7 shows part of the differential 52 of FIG. 2 and of the friction clutch 32 thereof with the adjusting element 38. The adjusting element 38, which can be altered in shape in dependence on temperature, is fastened on the planet carrier 8 via a clutch disc 90 and clamps in therebetween a friction plate or clutch plate 92, which is engaged by an outer tooth formation 94 of one output shaft 10.

Figure 8:
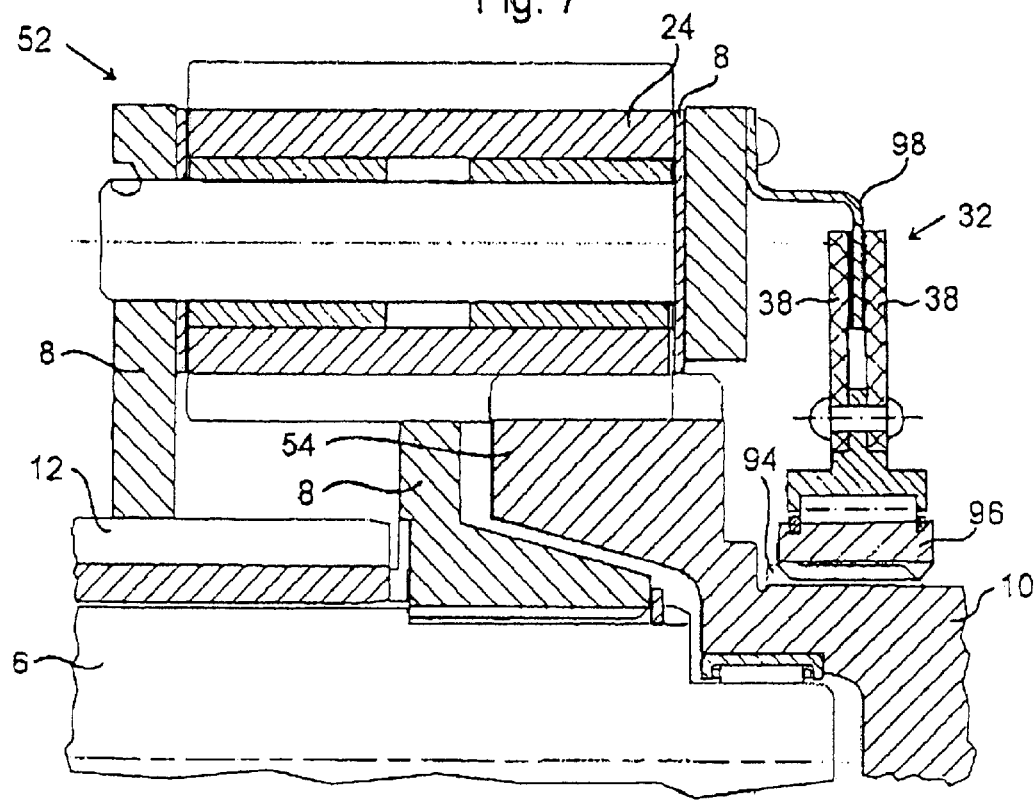
FIG. 8 shows the differential of FIG. 2 with a further embodiment of the friction clutch according to the invention.

In the case of the embodiment of FIG. 8, two adjusting elements 38 which can be altered in shape depending on temperature, preferably bimetallic spring plates, one axially movably disposed on a coupling spline structure 94 of one output shaft 10 via a carrier 96, said adjusting element clamping in between them a friction plate 98 which is fastened on the planet carrier 8.

Figure 9:
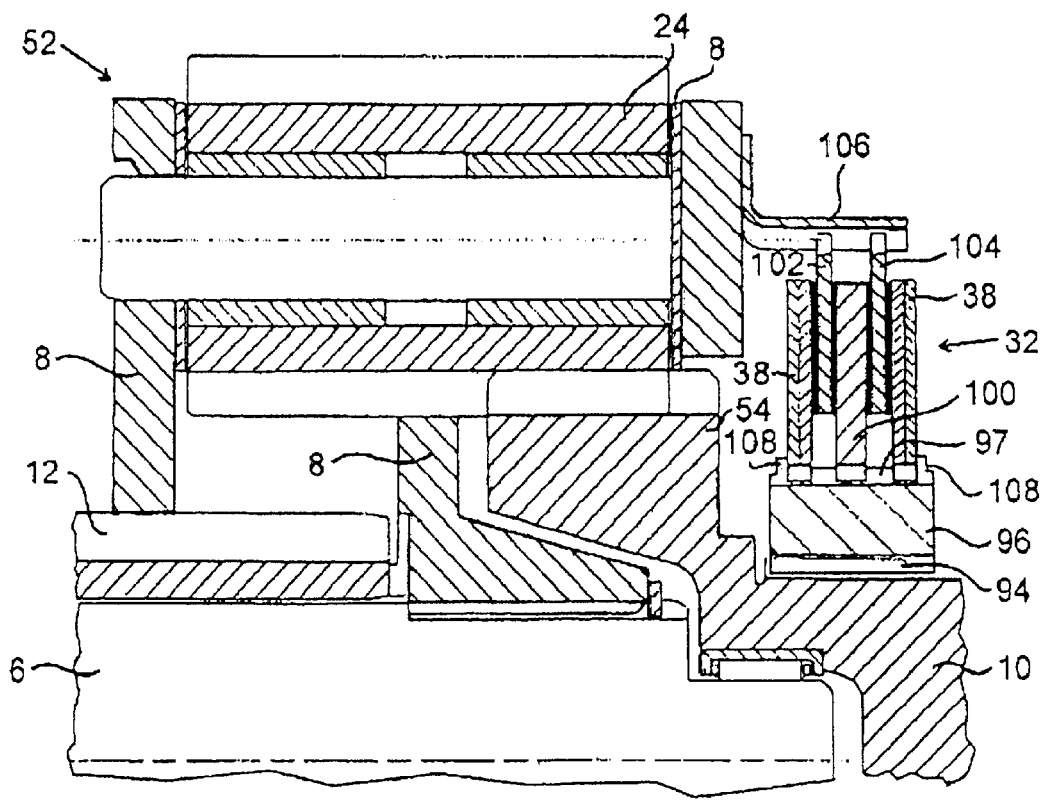
FIG. 9 shows the differential of FIG. 2 with yet a further embodiment of the friction clutch according to the invention.

FIG. 9 shows the same detail of the differential as FIG. 2 with a further embodiment of the friction clutch 32 and the temperature-dependent adjusting element 38. A carrier 96 is disposed axially movably on a coupling spline structure 94 of one output shaft 10 and via a further coupling spline structure 97, which is formed on its outer circumference, carries two adjusting elements 38 which can be altered in shape depending on temperature, and a steel plate 100 is received between the elements 38. Extending in each case between the steel plate 100 and the two adjacent adjusting elements 38, which can be altered in shape depending on temperature, are friction plates 102, 104, which are engaged by the adjusting elements 38 with the steel plate 100 to a more or less pronounced extent depending on the temperature. They are retained on their radially outer circumference by an outer carrier 106, which is fastened to the planet carrier 8. The two adjusting elements 38, which can be altered in shape depending on the temperature, are pre-stressed axially in the direction of the friction plates 102 and 104, and in the direction of the steel plate 100 arranged therebetween, by shoulders 108, which are provided axially outside the adjusting elements and are formed by outward bending of the material of the inner carrier 96.

Figure 10:
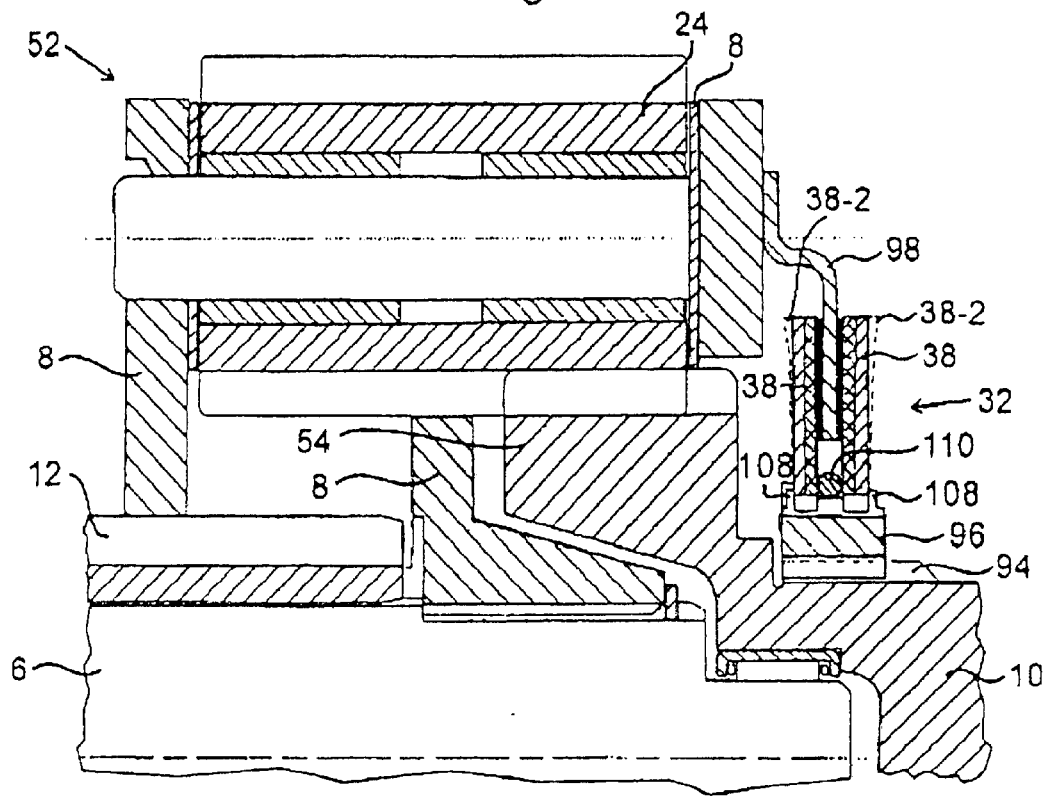
FIG. 10 shows the differential of FIG. 2 with yet another embodiment of the friction clutch according to the invention.

FIG. 10 shows a friction plate 98 which is fastened to the planet carrier 8 of the differential 52 and is clamped in axially between two adjusting elements 38, which can be altered in shape depending on the temperature, e.g. bimetallic discs. The two bimetallic discs 38 are pre-stressed axially in the direction of a spacer ring 110 and in the direction of the friction plate 98, on the outer circumference of an inner carrier 96, by material protrusions 108. The protrusions 108 consist of material, which has been forced out of the carrier 96 in the radially outward direction. The carrier 96 is splined axially onto a coupling spline structure 94 of one output shaft 10 and is thus connected thereto in a rotationally fixed manner. FIG. 10 shows the adjusting elements or bimetallic discs 38 in solid lines in a basic position, in which they butt axially against the friction plate 98 with a more pronounced contact-pressure force at a relatively low temperature of, for example, 80° C. than at a higher temperature. Furthermore, FIG. 10 shows in dashed lines 38–2 the bimetallic discs 38 in a position, in which they have been bent axially away from the friction plate 98 to the full extent by a predetermined temperature of, for example, more than 200° C. and in which they do not subject the friction plate 98 to any significant moment of friction.

In all of the embodiments described above, the temperature-dependent adjusting element 38 itself forms a clutch disc or clutch plate. However, the adjusting element 38 itself may be designed as a the friction plate or it may be provided with a friction lining. The adjusting element 38, which is altered in shape depending on the temperature, however may also be provided without forming a clutch disc or clutch plate.

Figure 11:
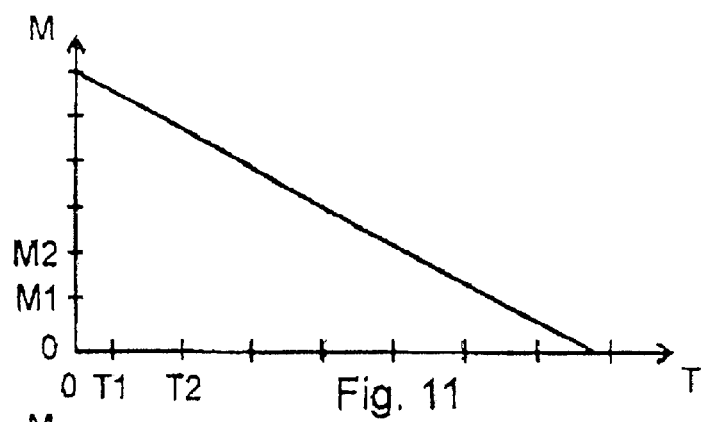
FIG. 11 shows a temperature/torque diagram which shows the torque, which can be transmitted by the clutch (or the clutch-engaging pressure) dependent on the temperature of the friction clutch of the invention, wherein, for all temperatures occurring during operation, the friction clutch transmission torque decreases as the temperature increases. That is the torque increases as the temperature decreases. The clutch temperature is plotted on the horizontal diagram axis and the clutch torque (or clutch-engaging pressure) is plotted on the vertical diagram axis.

In all of the embodiments described above, the temperature over torque characteristic curve, and thus also the temperature over clutch-engaging pressure characteristic curve, may have a downwardly sloping form over the entire temperature range which can may occur in a motor vehicle, as for example FIG. 11 shows. Conversely, this means that the clutch engaging pressure increases as the temperature-sensitive element becomes increasingly colder. The transmittable torque of the friction clutch 32 or 34 or 35, however, should still be small enough, even at very low temperatures, for example at −40° C., so that, in the case of torque shocks and differences in torque, which normally occur during vehicle operation, the clutch can change immediately from the non-slipping engaged state to friction slip operation for torque damping. Even at very low temperatures of, for example, −40° C., blocking of the differential transmission or the inter-axle differential should be avoided. For this purpose, an arrangement may be provided which limits the transmittable torque of the friction clutch to a maximum value. This may be realized by a specific form of the adjusting element 38 which can be altered in shape and/or size depending on temperature, i.e. of the bimetallic element or memory element or of a combination of such elements, or by a snap-action arrangement, via which the movement of the temperature-dependent adjusting element is deflected in another direction, or by an idling path for the temperature-dependent adjusting element or in a similar manner.

Figure 12:
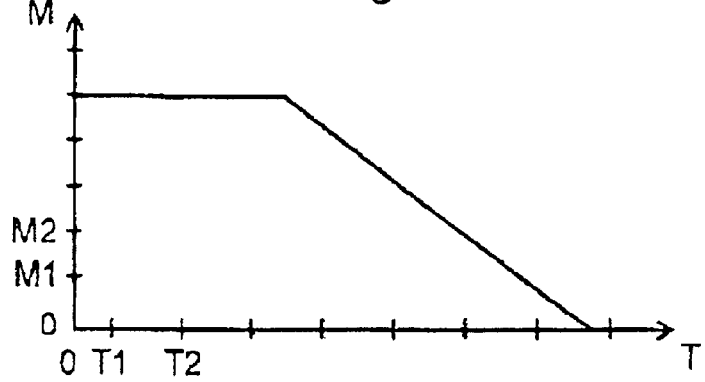
FIG. 12 shows a temperature/torque diagram for the friction clutch in an embodiment in which the transmittable torque of the friction clutch remains constant in a defined lower temperature range and decreases in a defined upper temperature range as the temperature increases or, respectively, increases as the temperature decreases. The clutch temperature is plotted on the horizontal diagram axis and the clutch torque (or clutch-engaging pressure) is plotted on the vertical diagram axis.
Figure 13:
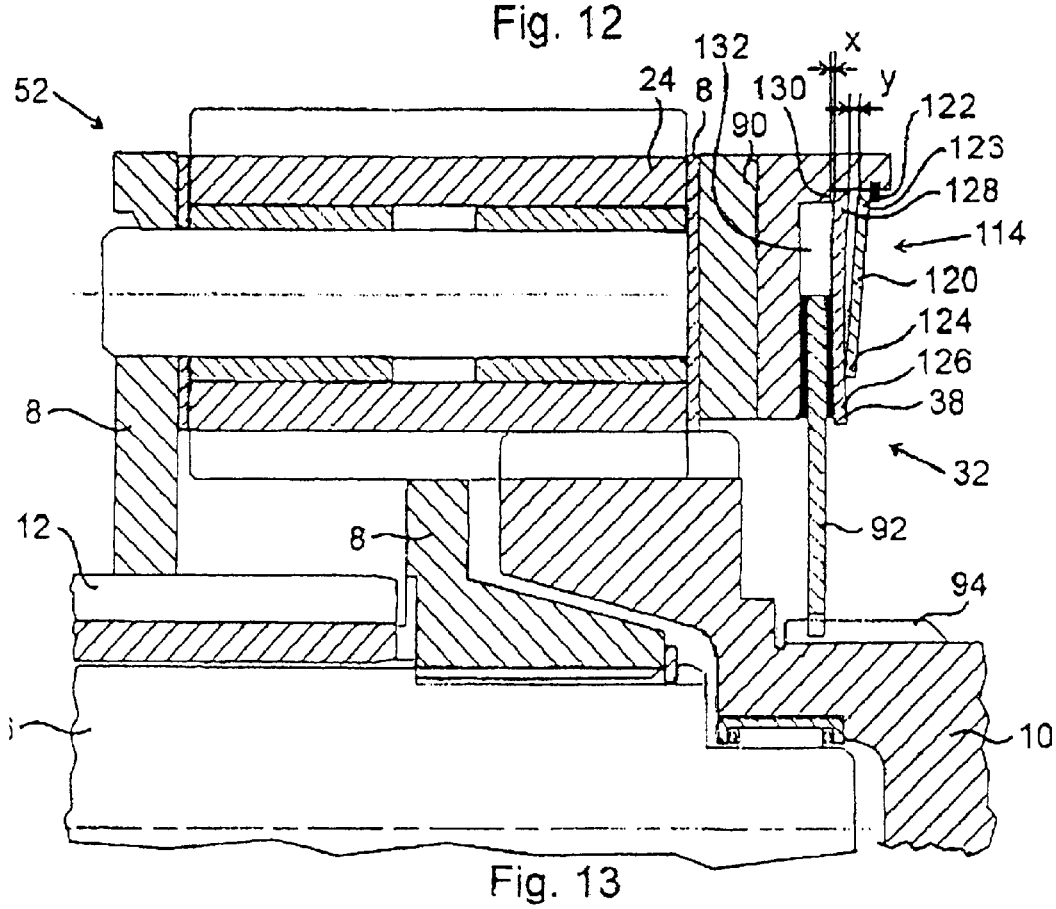
FIG. 13 shows a section of the differential of FIG. 2 with a the preferred embodiment of the friction clutch, by which, in accordance with FIG. 12, the clutch has a constant transmittable torque irrespective of temperature in the lower temperature range, and has a transmittable torque which decreases as the temperature increases and increases as the temperature decreases in the adjoining upper temperature range. The temperature-dependent adjusting arrangement of the friction clutch is provided with an idling path.

FIG. 13 shows a friction clutch 32 with an adjusting arrangement 114 which acts automatically depending on temperature and in accordance with FIG. 12. In a lower temperature range this arrangement has a parallel temperature to clutch-engaging pressure characteristic-curve profile. In an adjoining upper temperature range, however, it has a temperature to clutch-engaging pressure characteristic-curve profile which slopes down as the temperature increases. The clutch-engaging pressure determines the torque, which can be transmitted by the friction clutch. This embodiment of the friction clutch and temperature-dependent adjusting arrangement is described, with reference to FIG. 13, by way of the differential 52 of FIG. 2, but can also be used for all other types of differentials.

In FIG. 13, a friction plate 92 or clutch plate, which has been splined axially onto a coupling spline structure 94 of one output shaft 10, is pressed with a predetermined force by a spring 120, e.g. a dish spring, in the direction of a clutch disc 90 which is fastened on the planet carrier 8. The spring 120 presses the friction plate 92 in the direction of the clutch disc 90 with a constant force which is, essentially independent of temperature, or can only alter to a slight extent It thus produces a clutch-engaging pressure which remains essentially the same irrespective of the temperature. A maximum transmittable clutch torque, corresponding to the horizontal diagram line in FIG. 12 is provided thereby. The radially outer spring end 123 is supported in one axial direction (to the right) on the clutch element 90 by a stop 122, for example by a spring ring 122, with the result that the radially inner spring end 124 presses the friction surfaces of the friction clutch 32 against one another in the opposite axial direction (to the left).

The radially inner section 126 of an adjusting element 38, which can be altered in shape depending on the temperature, and which in particular is flexible, e.g. a bimetallic annular disc, is arranged between the radially inner spring end 124 and the friction plate 92. The radially outer end 128 of the adjusting element 38 is arranged with an axial clearance "x plus y" between an axially outer (right-hand) stop, e.g. formed by the radially outer spring end 122, and an axially inner (left-hand) stop 130 of a central depression 132 of the clutch disc 90.

The axial clearance "x plus y" is an idling path for the radially outer end 128 of the adjusting element 38. The radially outer end 128 can therefore not be supported axially for the length of the idling path, so that the radially inner section 126 of the adjusting element 38 cannot produce any axial force in one axial direction or the other. As a result, it does not influence the engaging pressure of the friction clutch 32 in this range. The engaging pressure of the friction clutch is only produced by the spring 120 and is thus constant, corresponding to that curve section in FIG. 12 which extends horizontally in relation to the temperature axis. The engagement pressure is therefore independent of the clutch temperature. This prevents the clutch-engaging pressure, below a predetermined temperature of, for example, 80° C., from becoming so high that the friction clutch cannot assume slip operation. As the clutch temperature increases, the radially outer end 128 of the adjusting element 38 bends from right to left as shown in FIG. 13. In the case of a temperature reduction, it bends in the opposite direction from left to right. If the clutch temperature increases beyond the predetermined value of, for example, 80° C., the radially outer end of the adjusting element 38 bends to such an extent that it butts against the inner stop 130 of the clutch disc 90, said stop extending outwardly (to the right). This is the temperature, in FIG. 12, where the horizontal diagram line intersects the oblique diagram line. If the temperature increases further, then the radially outer end 128 of the adjusting element 38 is supported on the outwardly extending inner stop 130 and the adjusting element 38, at its radially inner end section 126, presses to a more pronounced extent against the radially inner end 124 of the spring 120 away from the friction plate 92 in the axial direction. This means that, from a predetermined temperature value of, for example, 80° C., the clutch-engaging pressure produced by the spring 120 is reduced more and more, as the clutch temperature increases, by the adjusting element 38 which is deformed depending on temperature, in accordance with the curve section sloping down to the right in FIG. 12.

Figure 18:
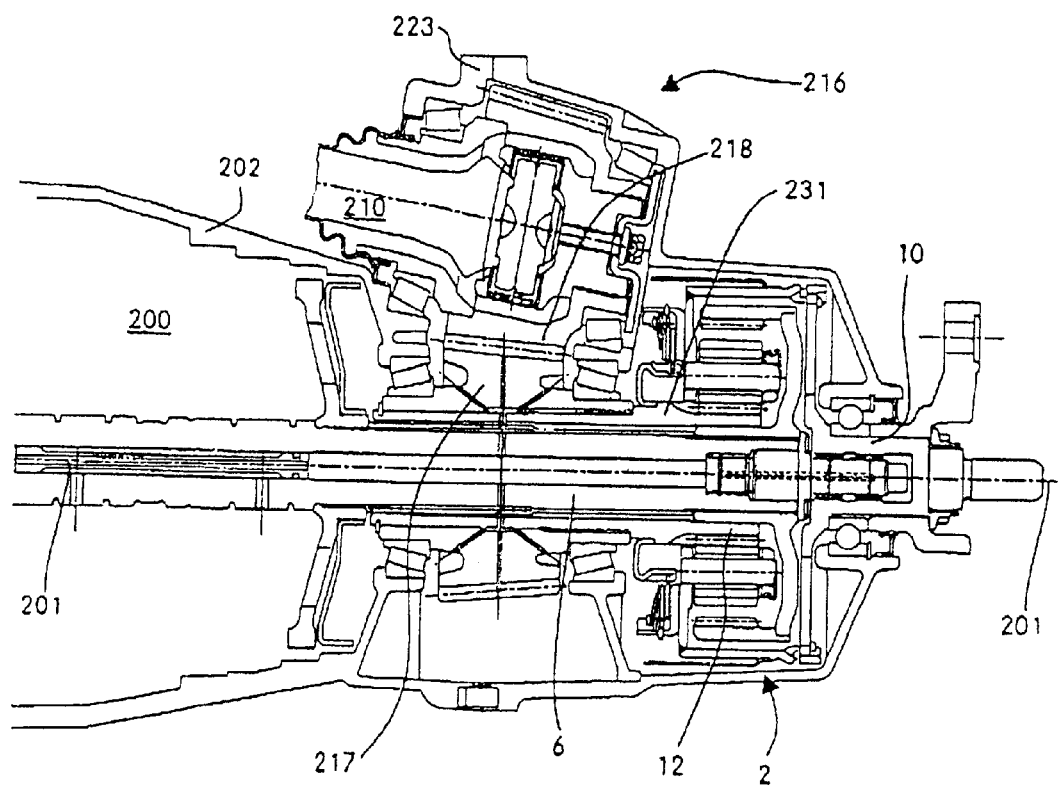
FIG. 18 shows, in an axial cross-sectional view, a longitudinally installed drive train for an all-wheel-driven motor vehicle, the drive train comprising, inter alia, a differential transmission.

FIG. 18 shows, a part of a longitudinally installed motor-vehicle drive train which has, inter alia, an automatic transmission 200 with a transmission output shaft which, in the installed state, extends toward the rear of the motor vehicle. This transmission output shaft forms the input shaft 6 of the differential 2, which is explained in more detail in FIG. 19.

The automatic transmission 200 has a transmission housing 202 with an integrally formed bearing housing 223 for a lateral output 216, with the result that the automatic transmission 200 can be utilized cost-effectively, as an "add-on", for an all-wheel drive arrangement.

In such n arrangement, the transmission output shaft or input shaft 6, extends to the straightforward rear-wheel drive axle, is connected, via the differential 2 and a drive shaft for rear-wheel drive, to a pinion shaft of a rear-axle drive (not illustrated specifically) such that a first part of the drive torque is transmitted to the rear-axle. A second part of the drive torque is transmitted to a front axle by the input shaft 6 via the differential 2,
a drive pinion 217, an output pinion 218,
a drive shaft 210 of the lateral output 216, and
a bevel pinion shaft of a front-axle (not illustrated specifically).

By means of the differential 2, it is possible to distribute output torques to the front-axle and the rear-axle and to compensate for differences in speed of the front and rear wheels.

The drive shaft 210 of the lateral output 216 is tilted horizontally by an angle of approximately 8° in relation to the drive-train longitudinal axis 201. The drive shaft 210 of the lateral output 216 is tilted vertically by an angle of approximately 4° in relation to the drive-train longitudinal axis 201.

The lateral output 216 is formed by two gears, that is, by the drive pinion 217 and the output pinion 218, which meshes with the drive pinion. The drive pinion 217 is connected in a rotationally fixed manner to a hollow shaft 231, which is configured integrally with a sun gear 12 of the differential 2. The input shaft 6 extends within the hollow shaft 231. The output pinion 218 is mounted in an x-arrangement in the bearing housing 223 by means of a tapered roller bearing means.

In order to provide for the horizontal angle and the vertical angle (not illustrated specifically), the drive shaft 210 is arranged in an articulated manner, by means of a universal joint, radially within the output pinion 218. Furthermore, at the front, as seen in the direction of travel—i.e. at the other end of the drive shaft 210—the latter is coupled in an articulated manner, by a further universal joint, to the bevel pinion shaft (not illustrated specifically) of the front-axle.

With the drive train according to FIG. 18, the drive pinion 217 and the output pinion 218, which meshes with the drive pinion, are each configured as tapered spur gears. The drive shaft 210 is arranged on the right-hand side, as seen in the direction of travel, of the drive motor (not illustrated specifically).

Figure 19:
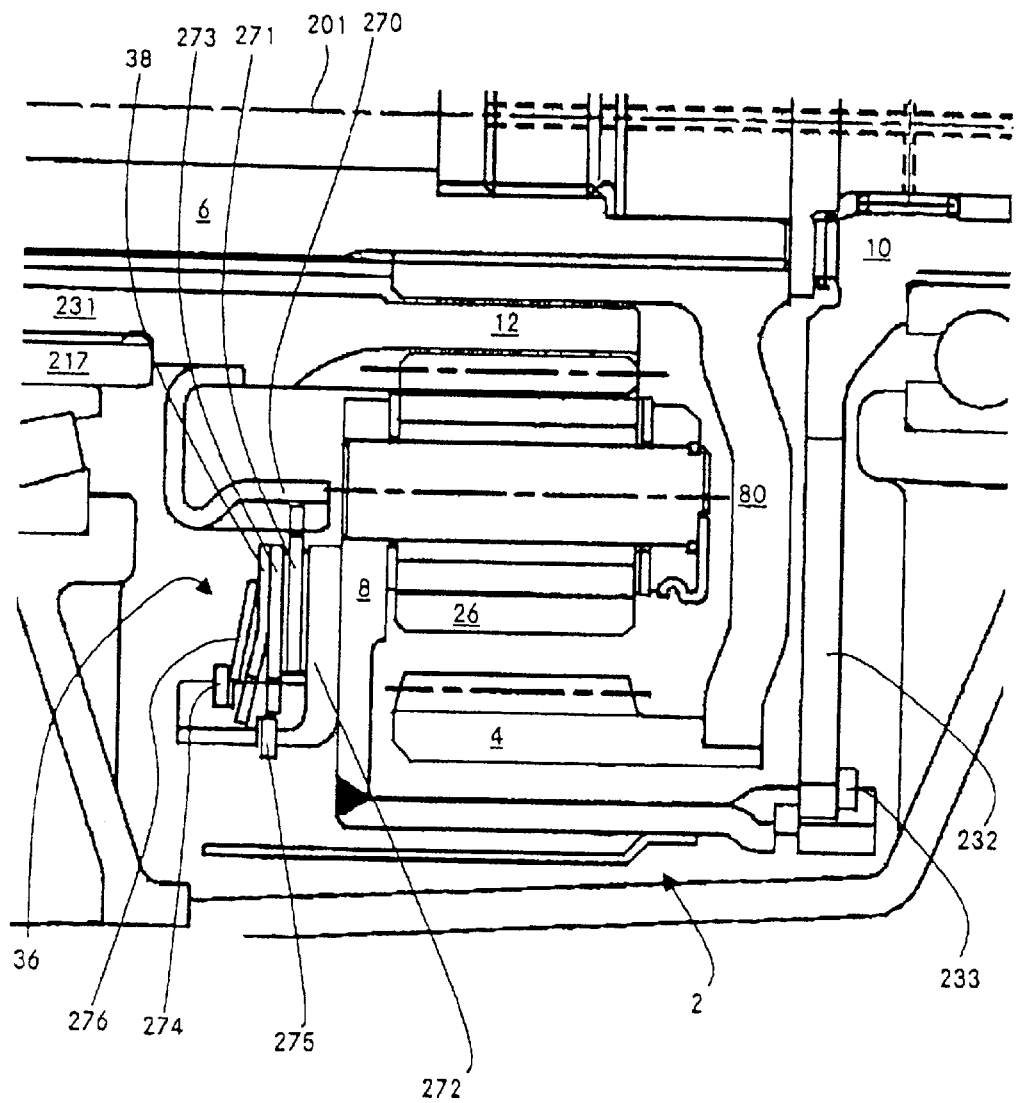
FIG. 19 shows, in a partial cross-sectional view, the differential transmission of FIG. 18, wherein only the sun gear is coupled to the planet carrier by means of a friction clutch with a temperature-dependent adjusting element.

FIG. 19 shows, in a sectional view, a detail of the differential 2 from FIG. 18. In this case, it is only the sun gear 12, which is coupled to the planet carrier 8 by means of a friction clutch 36 with a temperature-dependent adjusting element 38.

The input shaft 6 is connected in a rotationally fixed manner, by means of a splined shaft structure, to the connecting element 80, which is connected in a fixed manner on its radially outer circumference to the internally geared wheel 4. The connecting element 80 and the internally geared wheel 4 form a cup having an opening directed towards the automatic transmission 200 as can be seen in FIG. 18. This cup is disposed in the planet carrier 8, which is likewise of cup-like configuration, with visible planet gears 26 and other planet gears, which are not visible, projecting into the cup of the connecting element 80. The base 232 of the cup-like planet carrier 8 is connected in a fixed manner to the transmission output shaft 10. In order to render this compact construction installable, the base 232 is connected by means of a shaft/hub spline structure which can be released for installation/removal. For axially securing the shaft/hub spline structure, which is axially displaceable, an axial securing ring 233 is inserted in the region of the toothed structure.

The friction clutch 36 with the temperature-dependent adjusting element 38 is arranged in the axial region between the planet carrier 8 and the drive pinion 217.

The friction clutch comprises, in addition to the above-mentioned adjusting element 38:

a.) a radially inner carrier ring 270,
  a.a.) which, at its inside, is engaged with the hollow shaft 231 and
  a.b.) which, on its outer circumference, has an axially extending outer spline structure,
    a.b.a.) in by a first axially displaceable friction plate 271 is engaged,
b.) a radially outer carrier cup ring 272,
  b.a.) which includes a base, which is welded to the planet carrier 8 and
  b.c.) of which the wall, on the inside, has an axially extending inner,
    b.c.a.) in which a second axially displaceable friction plate 273 and the temperature-dependent adjusting element 38, configured as a plate, an engaged and into which a first axially fixed axial securing ring 274 is inserted,
  b.d.) and into the wall of which, on the outside, a second axially fixed axial securing ring 275 is inserted,
c.) a dish spring 276 which is supported on the first axial securing ring 274 and biases, in tandem,
  the adjusting element 38,
  the second friction plate 273 and
  the first friction plate 271 toward the cup base of the outer carrier cup ring 272.

In this case, the temperature-dependent adjusting element 38 is accommodated with play between the two axial securing rings 274 and 275, with the result that, in the case of a temperature increase above a limit value, the adjusting element 38 comes into abutment against the radially outer axial securing ring 275 and thus reduces the transmittable torque between the planet carrier 8 and hollow shaft 231.

Figure 20:
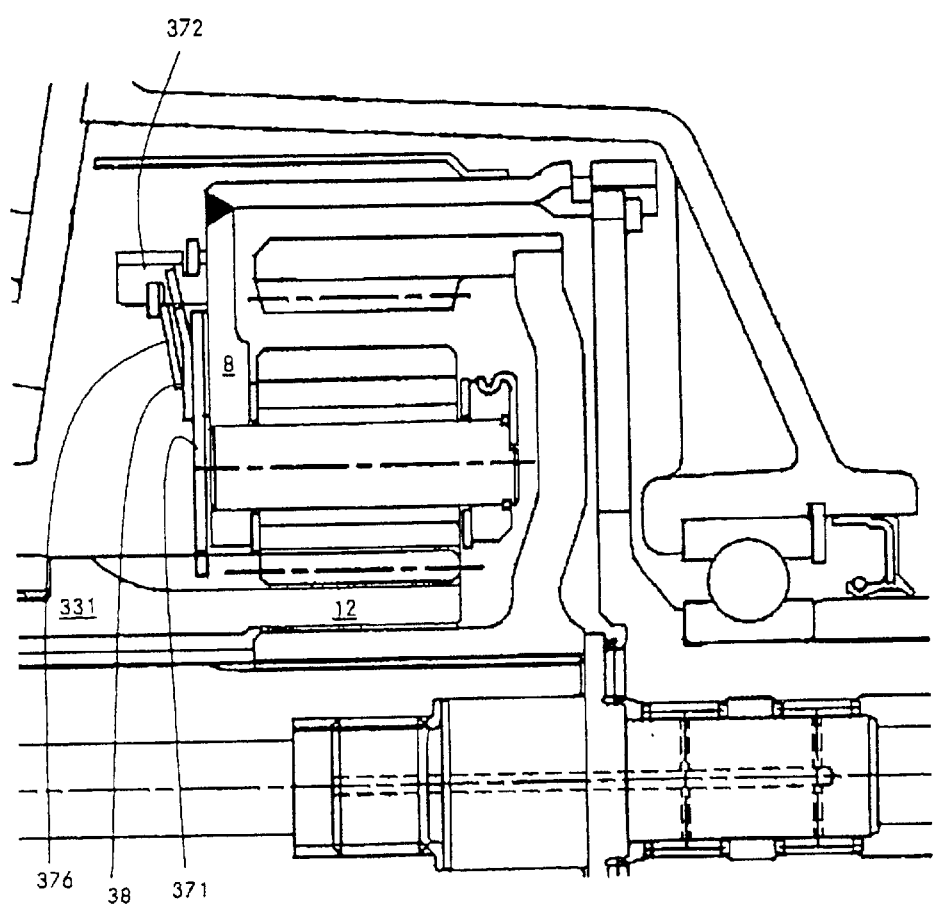
FIG. 20 shows, in a partial cross-sectional view, another embodiment of a transmission which can be used in a drive train according to FIG. 18 and is optimized even further in respect of the axial installation space required.

FIG. 20 shows, in a cross-sectional view, a second exemplary embodiment of the differential 2, which is optimized further in respect of the axial installation space required and can be used in a drive train according to FIG. 18.

Only the differences in relation to the previous exemplary embodiment will be mentioned below.

Instead of the outer carrier cup ring, a ring 372 is connected to the planet carrier 8 on the outside in the radial direction, such that a friction plate 371, which is arranged in an axially displaceable manner in relation to the hollow shaft 331, butts directly against the planet carrier 8. This friction plate 371 is accommodated directly in a rotationally fixed manner in the tooth structure of the sun 12. This means that it is exclusively the friction plate 371 and the temperature-dependent adjusting element 38 which are braced between a cup spring 376 and the planet carrier 8.

In all the embodiments, it is possible to have a rectilinear or curved temperature to clutch-engaging pressure characteristic curve.

Figure 14:
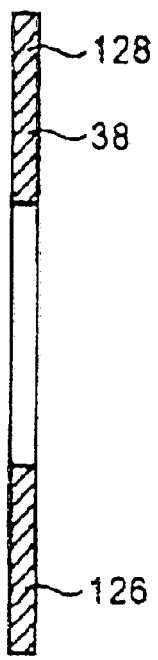
FIG. 14 shows an axial section through an adjusting element, which can be altered in shape depending on the temperature. It comprises a bimetallic annular disc of the adjusting arrangement for automatically adjusting, in a temperature-dependent manner, the engaging pressure and thus the transmittable torque of the friction clutch according to any one of the above-mentioned configurations, for example the configuration of FIG. 13, in a flat form at right angles to the center axis of the disc and at a relatively low operating temperature of, for example, 100° C.
Figure 15:
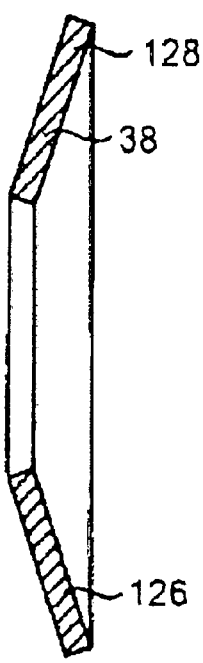
FIG. 15 shows an axial section of the annular disc-like adjusting element of FIG. 14, deformed in a dish-like manner by a very low temperature of, for example, minus 40° C.
Figure 16:
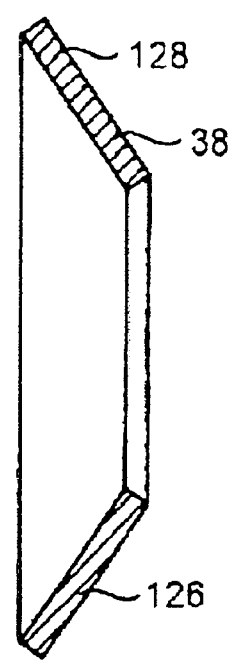
FIG. 16 shows an axial section of the annular disc-like adjusting element of FIG. 14 curved in a dish-like manner in the opposite direction to FIG. 15 by a comparatively high operating temperature of, for example, +150°C.
Figure 17:
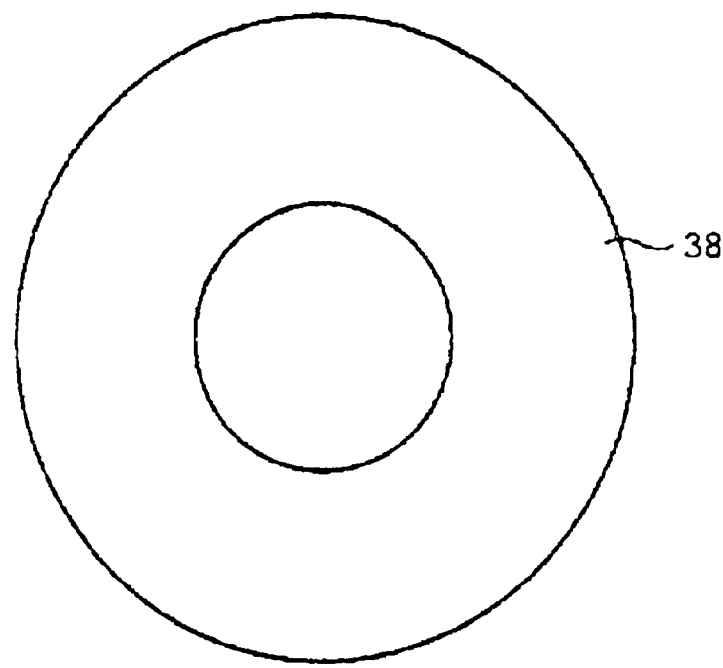
FIG. 17 is an end view of the annular-disc-like adjusting element of FIG. 14, such an annular-disc-like adjusting element being described below with reference to FIG. 13. Of course, it can also be used for all other embodiments of the invention.

FIGS. 14, 15 and 16 show axial sections, and FIG. 17 shows an end view of the annular-disc-like adjusting element 38, which can be deformed in the form of a cup spring depending on the temperature. In FIG. 14, the adjusting element 38 is flat at, for example, 100° C. FIG. 15 shows it bent to the right in a dish-like manner adjacent the outer circumferential edge 128 at very low temperatures of, for example, −40° C. FIG. 16 shows the outer edge 128 bent to the left at high temperatures of, for example, +150° C.

In FIGS. 1 to 10, the adjusting element 38, which changes in shape depending on the temperature, presses the clutch 32 or 34 or 36 in the engagement direction. In FIG. 13, the clutch is forced by the spring 120, of which the spring force is essentially temperature-independent or only temperature-dependent to some extent, in the engagement direction and is forced by the adjusting element 38 in the disengagement direction. According to another embodiment of FIG. 13, the temperature-dependent adjusting element 38 may be arranged without any axial clearance, if necessary it may also be pre-stressed in the clutch-disengagement direction. The spring 120 is preferably in the form of a dish spring, but may also be in any other appropriate form, for example, in the form of an annular element, and it may also comprise a multiplicity of segments. The same applies to the temperature-dependent adjusting element 38. All the embodiments mentioned can be used for all types of differentials, as they are shown, for example, in FIGS. 1, 2 and 3.

The friction clutch 32 of the invention is designed, in all configurations, such that it is engaged without slippage in the normal state, but, rather than acting as a locking element for locking the differential, e.g. rather than forming an inter-axle lock of a four-wheel drive, it only acts as a torque-damping element. The maximum transmittable torque of the clutch is so small that, in the case of torque shocks, as they occur during normal motor-vehicle operation, the clutch begins to slip and thus damps the torque shocks. The clutch thus also slips when the torque, without any shock, exceeds the value of the maximum transmittable torque. Furthermore, the friction clutch 32 according to the invention is provided with at least one element 38, which can be altered in shape or size depending on the temperature and, at least in a predetermined temperature range of the friction clutch, reduces the maximum transmittable torque of the latter as the clutch temperature increases, and increases the same as the clutch temperature decreases. According to a preferred embodiment, the friction clutch is thus fully disengaged when the clutch temperature exceeds a predetermined maximum value. According to a further preferred embodiment, the maximum torque is limited. The greater the torque which can be transmitted to the drive train from a drive motor, the greater the maximum torque of the friction clutch can be. The maximum transmittable torque of the friction clutch may be, for example, 30% of the torque, which can be transmitted to the drive train by the drive motor. A smaller value, for example 20%, is usually sufficient. A realistic value is approximately 50 Nm. However, a smaller value, for example only 20 Nm is usually sufficient. When the friction clutch disengages, the torque transmission capability is zero.

What is claimed is:

1. A motor-vehicle drive train including a differential which has a differential input part and two differential output parts, comprising: a coupling arrangement for two of the three differential parts including a torque-damping friction clutch capable of transmitting clutch torque without slippage, which is sufficiently small such that, in the case of torque shocks and in the case of differences in torque, as they normally occur between two differential parts during conventional motor-vehicle operation, the clutch automatically converts to a friction slip operation, said friction clutch including a temperature-dependent adjusting means which, at least in a predetermined temperature range, reduces the clutch-engaging forces and thus the transmittable clutch torque, as the clutch temperature increases and increases clutch-engaging forces as the clutch temperature decreases.

2. A motor-vehicle drive train according to claim 1, wherein said differential is a transfer gear with two output parts, of which one is drivingly connected to a drive train of one motor-vehicle axle and the other output part is connected to a drive train of another motor-vehicle axle.

3. A motor-vehicle drive train according to claim 1, wherein said differential is a differential gear of a motor-vehicle axle.

4. A motor-vehicle drive train according to claim 1, wherein said temperature-dependent adjusting means has at least one temperature dependent adjusting element which is altered in shape depending on the clutch temperature.

5. A motor-vehicle drive train according to claim 4, wherein said the adjusting element is resilient in the clutch-actuating direction.

6. A motor-vehicle drive train according to claim 4, wherein said friction clutch is pre-stressed in the engagement direction by the adjusting element and so that it is kept engaged during normal operating temperatures of said clutch.

7. A motor-vehicle drive train according to claim 4, wherein at least one spring element is arranged co-axially with said adjusting element so as to counteract the clutch-engaging pressure of the adjusting element.

8. A motor-vehicle drive train according to claim 4, including at least one spring element, which pre-stresses the friction clutch in the engagement direction with a predetermined spring force and thus keeps the clutch engaged for damping friction slip operation at normal operating temperatures, and said at least one adjusting element being arranged so as to increasingly counteract the clutch-engaging pressure of said spring element as the temperature increases.

9. A motor-vehicle drive train according to claim 1, wherein the temperature-dependent adjusting means is designed so as to disengage the friction clutch when the friction clutch temperature exceeds a predetermined temperature value.

10. A motor-vehicle drive train according to claim 1, wherein the engaging pressure of the friction clutch, and thus the maximum torque which can be transmitted by the friction clutch without slippage, has an upper limit, which cannot be exceeded irrespective of how low the clutch temperature drops.

11. A motor-vehicle drive train according to claim 1, wherein the temperature-dependent adjusting means, in a lower temperature range of the friction clutch, has a temperature to clutch-engaging pressure characteristic-curve section, which is parallel to the temperature axis of a temperature/clutch-engaging pressure diagram and, an adjoining upper temperature range, with a temperature to clutch-engaging pressure characteristic-curve section, which slopes down as the temperature increases and over which the clutch-engaging pressure decreases continuously as the clutch temperature increases.

12. A motor-vehicle drive train according to claim 11, wherein, below a predetermined temperature, the temperature-dependent adjusting means has an idling path over which said clutch is disengaged and thus does not cause any temperature-dependent changes in engaging pressure of the friction clutch below a predetermined temperature, so that, below the predetermined temperature, the engaging pressure of the friction clutch remains constant irrespective of temperature.

13. A motor-vehicle drive train according to claim 12, including at least one spring element, which pre-stresses the friction clutch in the engagement direction with a predetermined spring force and thus keeps the clutch engaged for damping friction slip operation at normal operating temperatures, and said at least one adjusting element being arranged so as to increasingly counteract the clutch-engaging pressure of said spring element as the temperature increases, said spring element being resiliently engaged between the friction clutch and a transmission part, said transmission part being stationary in the clutch-actuating direction irrespective of clutch-actuating movements, and the adjusting element, whose force changes with the temperature, has a first end section, which is engaged between the spring element and the friction clutch, and a second end section remote from the first end section which is freely movable in the clutch-actuating direction with a defined idling clearance between two stops spaced apart from one another in the clutch-actuating direction, without producing a significant support moment for one end section in the clutch-actuating direction, and the temperature-dependent adjusting element is thermally deformable in the clutch-actuating direction at least between its two end sections.

14. A motor-vehicle drive train according claim 1, wherein for all temperatures of a motor vehicle, the temperature-dependent adjusting means has a sloping temperature to clutch-engaging pressure characteristic curve and according to which the clutch-engaging pressure decreases continuously as the clutch temperature increases.

15. A motor-vehicle drive train according to claim 4, wherein said at least one temperature-dependent adjusting element is provided with a friction lining and thus forms part of the friction clutch.

16. A motor-vehicle drive train according to claim 4, wherein the temperature-dependent adjusting element is disposed axially movably on a spline structure, which is formed on one of the differential parts.

17. A motor-vehicle drive train according to claim 4, wherein the temperature-dependent adjusting element is fastened to one of said two coupled differential parts.

18. A motor-vehicle drive train according to claim 4, wherein said at least one temperature-dependent adjusting element is a bimetallic element.

19. A motor-vehicle drive train according to claim 4, wherein said at least one temperature-dependent adjusting element is a shape memory element.

20. A motor-vehicle drive train according to claim 1, wherein said temperature-dependent adjusting means is integrated in said differential.

21. A motor-vehicle drive train according to claim 1, wherein one of said differential output parts is a planet carrier which is connected for torque transmission to a rear-axle drive and has at least one pair of planet gears, and the other of said differential output parts is a sun gear connected to a front-axle drive, and wherein said differential input part is an input shaft of said sun gear, and the two differential output parts are cup-like, and disposed one within the other, and are capable of being engaged with one another with a friction fit by means of said friction clutch.

* * * * *